(12) United States Patent
Osawa et al.

(10) Patent No.: US 7,618,219 B2
(45) Date of Patent: Nov. 17, 2009

(54) BALL ENDMILL

(75) Inventors: Jiro Osawa, Aichi (JP); Yasuo Hamatake, Aichi (JP); Wataru Aoki, Nagoya (JP)

(73) Assignee: OSG Corporation, Aichi (JP)

( * ) Notice: Subject to any disclaimer, the term of this patent is extended or adjusted under 35 U.S.C. 154(b) by 64 days.

(21) Appl. No.: 11/578,267

(22) PCT Filed: Oct. 18, 2005

(86) PCT No.: PCT/JP2005/019086

§ 371 (c)(1),
(2), (4) Date: Oct. 11, 2006

(87) PCT Pub. No.: WO2007/046132

PCT Pub. Date: Apr. 26, 2007

(65) Prior Publication Data

US 2008/0286058 A1   Nov. 20, 2008

(51) Int. Cl.
  *B23C 5/10* (2006.01)
  *B23B 51/02* (2006.01)

(52) U.S. Cl. .............................. 407/53; 407/54; 407/30

(58) Field of Classification Search ................. 407/30, 407/42, 53, 54, 55
See application file for complete search history.

(56) References Cited

U.S. PATENT DOCUMENTS 4,123,186 A * 10/1978 Hoadley ..................... 407/54
6,602,029 B1 * 8/2003 George ...................... 408/230
6,846,135 B2 * 1/2005 Kuroda et al. ................ 407/53
7,223,053 B2 * 5/2007 Flynn ......................... 407/53
7,478,977 B2 * 1/2009 Osawa et al. ................ 407/42
2007/0160429 A1 * 7/2007 Volokh ....................... 407/53

FOREIGN PATENT DOCUMENTS

| JP | 53-31286 | 3/1978 |
| JP | 55-26620 | 2/1980 |
| JP | 58-164617 | 11/1983 |
| JP | 2-303707 | 12/1990 |
| JP | 4-51928 | 12/1992 |
| JP | 2000-117522 | 4/2000 |
| JP | 2002-529261 | 9/2002 |
| JP | 2004-181563 | 7/2004 |
| JP | 2005-118960 | 5/2005 |
| JP | 2005-224898 | 8/2005 |

* cited by examiner

*Primary Examiner*—Will Fridie, Jr.
(74) *Attorney, Agent, or Firm*—Muramatsu & Associates

(57) ABSTRACT

A ball endmill having (a) a cylindrical tool body and (b) ball-nosed end cutting edges each of which includes (b-1) a first portion, (b-2) a second portion and (b-3) a third portion. The first portion is defined by a circular arc which is convex in a direction of rotation of the tool body and which has a first radius of curvature as measured in a distal end view perpendicular to the axis. The second portion is defined by a straight line or a circular arc which is convex in the rotation direction and which has a second radius of curvature as measured in the distal end view. The third portion is defined by a circular arc which is convex in the rotation direction and which has a third radius of curvature as measured in the distal end view. The second radius of curvature is larger than the first radius of curvature. The third radius of curvature is smaller than the second radius of curvature.

16 Claims, 4 Drawing Sheets

Fig. 2
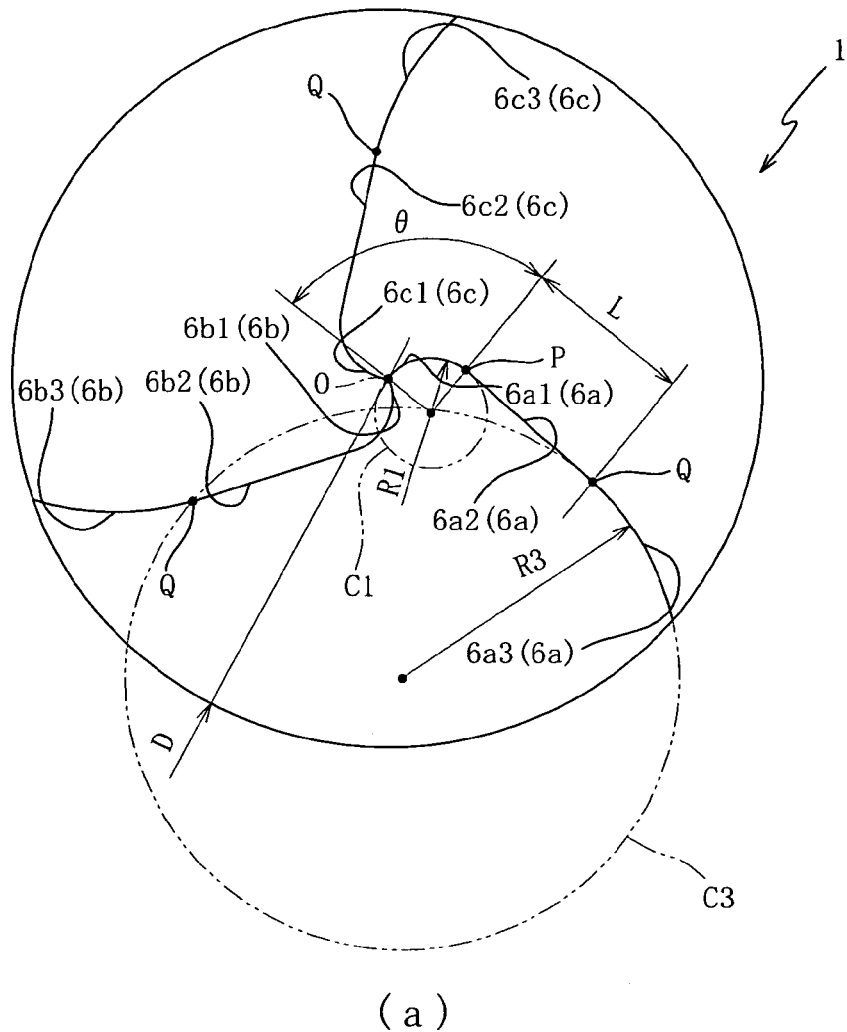
(a)
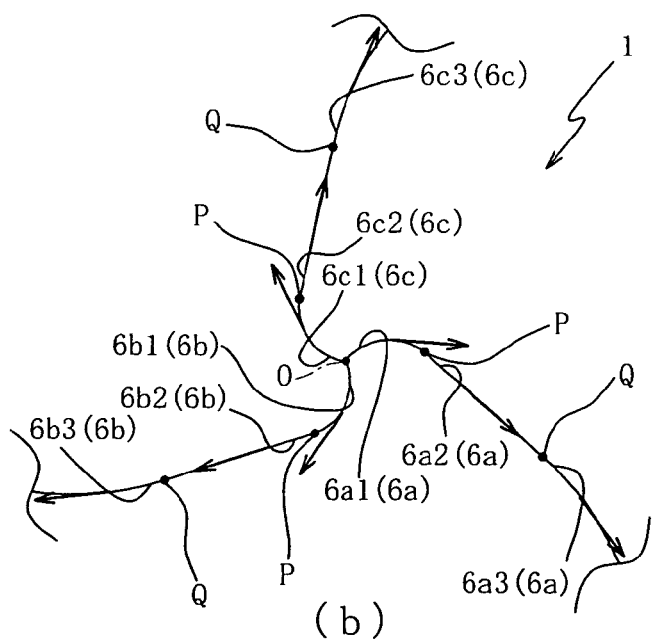
(b)

Fig. 3
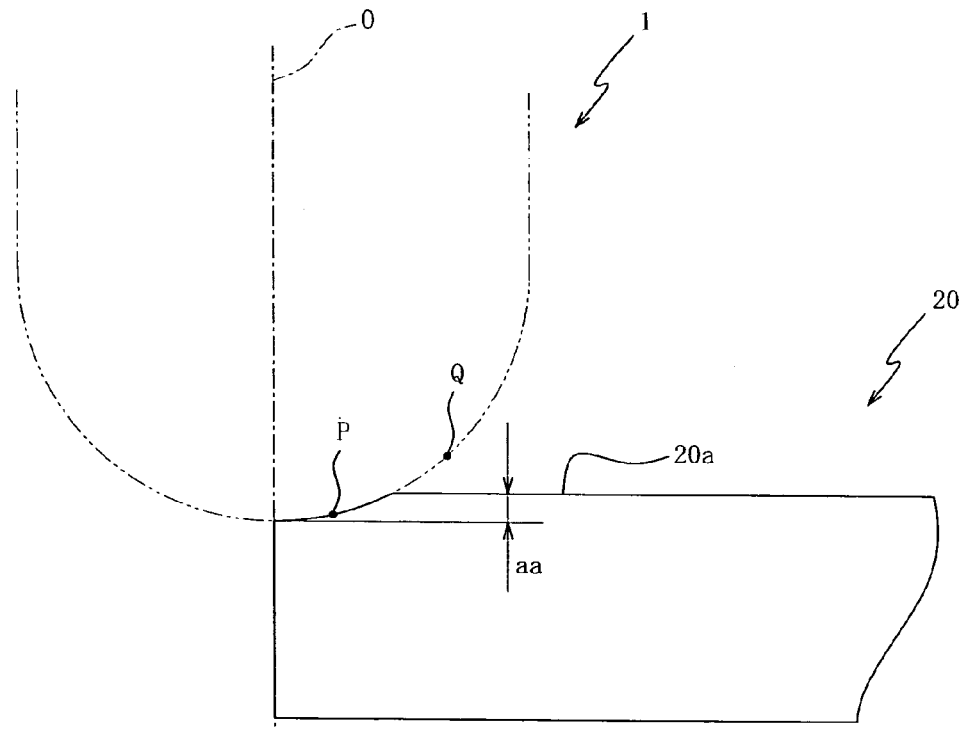
(a)
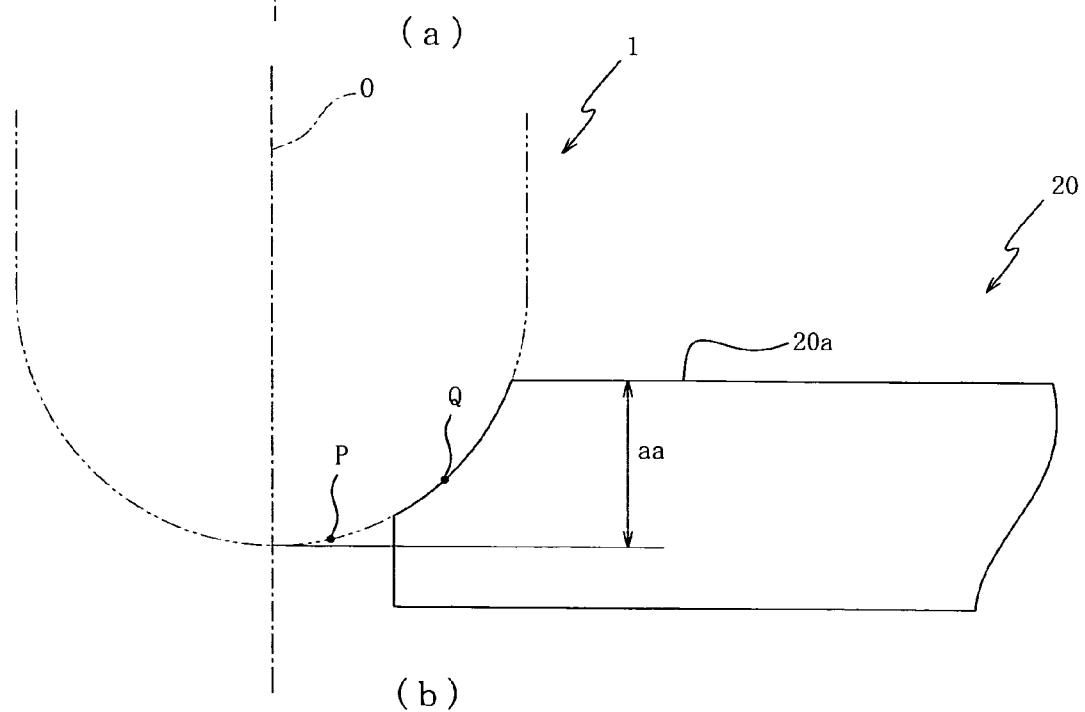
(b)

Fig. 4
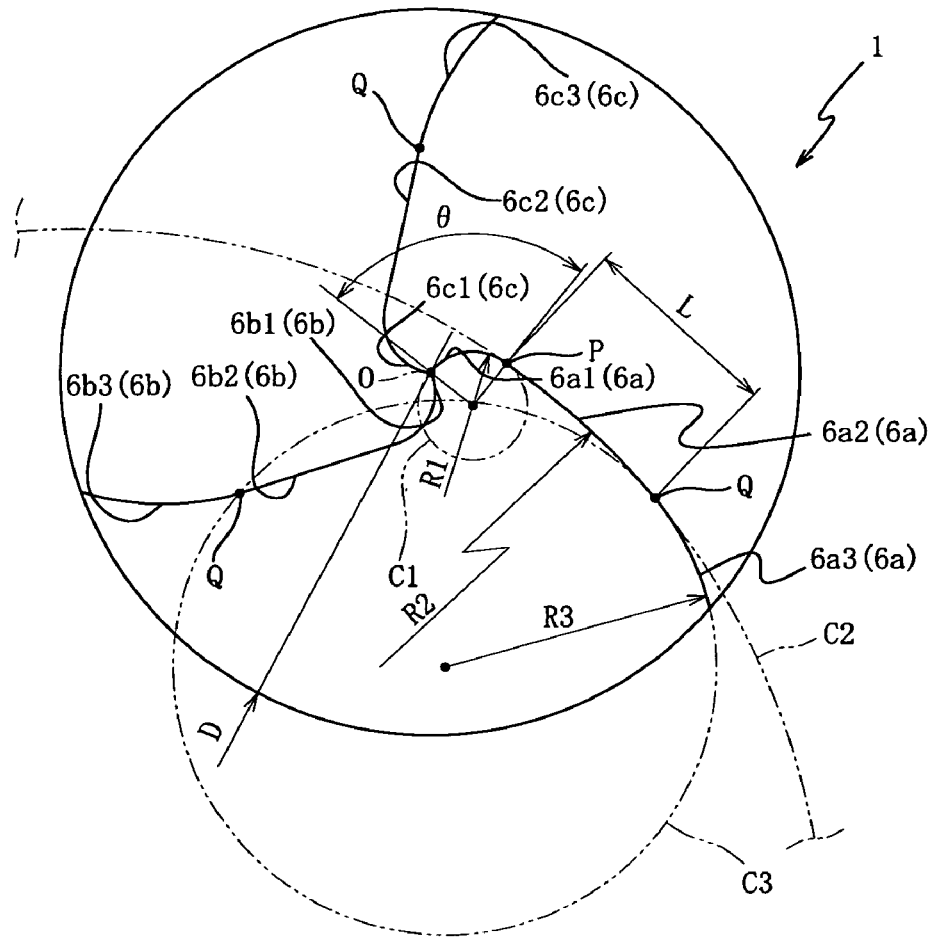
(a)
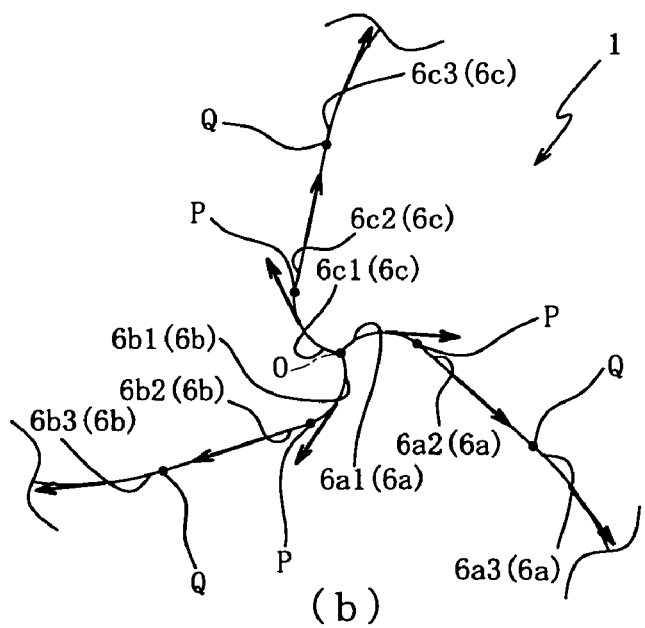
(b)

BALL ENDMILL

TECHNICAL FIELD

The present invention relates to a ball endmill, and more particularly to such a ball endmill that is capable of restraining its vibration thereby permitting a cutting operation to be performed at an increased feed rate with an increased depth of cut and leading to an improvement in efficiency of the cutting operation.

BACKGROUND ART

For machining a die or mold, there is often used a ball endmill having ball-nosed end cutting edges in its axially distal end portion. Conventionally, in such a ball endmill, each of the ball-nosed end cutting edges has an arcuate shape that is convex in a direction of rotation of the ball endmill for the purpose of improving its cutting performance. It is common that a radius of curvature of each arcuate-shaped ball-nosed end cutting edge is adapted to be constant from its inner peripheral portion to its outer peripheral portion (for example, see Patent Document 1).

Patent Document 1: JP-H04-51928Y2

DISCLOSURE OF INVENTION

Object to be Solved by the Invention

In recent years, there is a demand for reduction in time required for a cutting operation in which, for example, a die or mold is machined. For reducing the time for the cutting operation, namely, for improving the cutting efficiency, it is necessary to increase the feed rate and depth of cut.

However, in the conventional ball endmill, since the radius of curvature of each ball-nosed end cutting edge is constant from the inner peripheral portion to the outer peripheral portion, a cutting resistance (cutting torque) is exerted by a workpiece and acts on the ball endmill in a direction that is concentrated to be substantially constant, and consequently causing the ball endmill to be vibrated. Due to such a problem, the feed rate and the depth of cut can not be increased whereby the cutting efficiency can not be improved.

The present invention was developed for solving the above-described problem, and has an object to provide a ball endmill that is capable of restraining its vibration thereby permitting a cutting operation to be performed at an increased feed rate with an increased depth of cut and leading to an improvement in efficiency of the cutting operation.

Measures for Achieving the Object

For achieving the object, the first aspect of the invention defines a ball endmill including a cylindrical tool body which is to be rotated about an axis thereof as a rotary axis, and ball-nosed end cutting edges which are provided in a distal end portion of the tool body and which describe a semispherical-shaped locus while the tool body is being rotated, wherein each of the ball-nosed end cutting edges has a first portion formed to extend from the axis as a starting end thereof; a second portion formed to extend from a terminal end of the first portion as a starting end thereof; and a third portion formed to extend from a terminal end of the second portion as a starting end thereof; wherein the first portion is shaped to be arcuate which is convex in a direction of rotation of the tool body and which has a first radius of curvature as seen in a distal end view in a direction of the axis, the first radius of curvature being in a range of from 0.025 D to 0.10 D relative to an outside diameter D, wherein the second portion is shaped to be straight or arcuate which is convex in the direction of rotation of the tool body and which has a second radius of curvature as seen in the distal end view in the direction of the axis, the second radius of curvature being larger than the first radius of curvature where the second portion is shaped to be arcuate, and wherein the third portion is shaped to be arcuate which is convex in the direction of rotation of the tool body and which has a third radius of curvature as seen in the distal end view in the direction of the axis, the third radius of curvature being smaller than the second radius of curvature where the second portion is shaped to be arcuate.

According to the second aspect of the invention, in the ball endmill defined in the first aspect of the invention, the first portion has a central angle that is in a range of from 60° to 120° as seen in the distal end view in the direction of the axis.

Effects of the Invention

In the ball endmill defined in the first aspect of the invention, each of the ball-nosed end cutting edges includes the first, second and third portions having the respective first, second and third radii of curvature which are different in value from each other (wherein the second portion may be shaped to be either straight or arcuate). This construction causes a cutting resistance (cutting torque) exerted by a workpiece, to act in a direction that is different in the first, second and third portions of each ball-nosed end cutting edge, thereby making it possible to restrain vibration of the ball endmill.

That is, the direction in which the cutting resistance (cutting torque) is exerted by the workpiece on the ball endmill corresponds to a direction along each ball-nosed end cutting edge, i.e., a direction tangential to a circular arc defining each ball-nosed end cutting edge. Therefore, where the radius of curvature of each ball-nosed end cutting edge is constant from the inner peripheral portion up to the outer peripheral portion of the ball-nosed end cutting edge, as in the conventional ball endmill, the direction of the cutting resistance (cutting torque) does not substantially differ in the inner and outer peripheral portions of the ball-nosed end cutting edge, thereby easily causing the ball endmill to be vibrated.

On the other hand, in the ball endmill of the present invention, it is possible to cause the direction of the cutting resistance (cutting torque) exerted by the workpiece, to differ in the first, second and third portions of each ball-nosed end cutting edge, thereby making it possible to restrain vibration of the ball endmill. Owing to the reduction in the vibration, the feed rate and the depth of cut can be increased whereby the cutting efficiency can be improved.

Further, in the ball endmill of the present invention, the first radius of curvature is in the range of from 0.025 D to 0.10 D relative to the outside diameter D. If the first radius of curvature is smaller than 0.025 D relative to the outside diameter D, a spacing gap between the first portions of the adjacent ball-nosed end cutting edges in vicinity of the axis of the ball endmill is reduced whereby performance of evacuation of cutting chips is reduced. On the other hand, in the ball endmill of the present invention in which the first radius of curvature is not smaller than 0.025 D relative to the outside diameter D, the spacing gap between the first portions can be sufficient for improving the performance of evacuation of cutting chips.

Further, in the case where the first radius of curvature is smaller than 0.025 D relative to the outside diameter D, the spacing gap between the first portions of the adjacent ball-nosed end cutting edges in vicinity of the axis of the ball endmill is reduced. The reduction of the spacing gap, when each ball-nosed end cutting edge is ground by a grinding wheel in a grinding step, could cause the grinding wheel to interfere with the adjacent ball-nosed end cutting edge. On the other hand, in the ball endmill of the present invention in which the first radius of curvature is not smaller than 0.025 D relative to the outside diameter D, the spacing gap between the first portions can be sufficient for preventing the interference of the grinding wheel with the adjacent ball-nosed end cutting edge. Thus, it is possible to eliminate necessity of an excessively highly accurate control in the grinding step, leading to reduction in cost for machining the ball endmill.

Where the above-described interference of the grinding wheel could be caused, there is a limitation in designing configuration of a portion that could suffer from the interference (for example, an elimination of such a portion could result in reduction of strength). In this sense, the sufficient spacing gap between the first portions, which prevents the interference of the grinding wheel, is effective to increase a degree of freedom in designing.

If the first radius of curvature is larger than 0.10 D relative to the outside diameter D, the direction of a line tangential to the first portion of each ball-nosed end cutting edge does not substantially vary, as in the conventional ball endmill, the direction in which the cutting resistance (cutting torque) exerted by the workpiece and acting on the ball endmill does not substantially vary, thereby easily causing the vibration of the ball endmill. On the other hand, in the ball endmill of the present invention in which the first radius of curvature is not larger than 0.10 D relative to the outside diameter D, the direction of the line tangential to the first portion is caused to vary, so that the direction of the cutting resistance (cutting torque) can be caused to vary, thereby making it possible to restrain vibration of the ball endmill.

Further, in the case where the first radius of curvature is larger than 0.10 D relative to the outside diameter D, with an axial depth of cut of the ball endmill being set to a limit value 0.1 D (i.e., 10% of the outside diameter D), only the first portion of each ball-nosed end cutting edge is brought into contact with the workpiece. In this case, it is not possible to effectively enjoy the feature that causes the direction of the cutting resistance (cutting torque) exerted by the workpiece and acting on the ball endmill, to be different in the first and second portions of each ball-nosed end cutting edge. On the other hand, in the ball endmill of the present invention in which the first radius of curvature is not larger than 0.10 D relative to the outside diameter D, even where the axial depth of cut of the ball endmill is set to the limit value 0.1 D, the second portion as well as the first portion can be brought into contact with the workpiece, thereby making it possible to effectively enjoy the feature that causes the direction of the cutting resistance (cutting torque) exerted by the workpiece and acting on the ball endmill, to be different in the first and second portions. Thus, the vibration of the ball endmill can be restrained.

Further, in the ball endmill of the present invention, since each ball-nosed end cutting edge includes the first, second and third portions with the first radius of curvature being in the range of from 0.025 D to 0.10 D relative to the outside diameter D, each of the first, second and third radii of curvature can be made smaller than in the conventional ball endmill, whereby each ball-nosed end cutting edge can have an increased length. This construction leads to increase in a length of time for which each ball-nosed end cutting edge is in contact with the workpiece and the consequent reduction in an impact load acting on the ball endmill, thereby making it possible to restrain vibration of the ball endmill.

In addition, in the ball endmill of the present invention, since each ball-nosed end cutting edge can have the increased length, as described above, each ball-nosed end cutting edge is brought in contact at its increased area with the workpiece, thereby making is possible to increase a cutting performance of the ball endmill. Consequently, the feed rate and the depth of cut can be increased, enabling the cutting efficiency to be improved.

Specifically described, for example, in an operation to cut a metal wire (having a diameter d) by a metal column that is provided by a rectangular parallelepiped body (having a height a, a width b and a depth c), the metal wire can be cut in a shorter length of time in case where the metal column is operated to slide on the metal wire to utilize a length (depth c) of an edge that is an intersection between two surfaces of the metal column (i.e., two surfaces defining the height a and width b), than in a case where the metal column is pressed at its edge against the metal wire. That is, by thus increasing the cutting performance, the cutting efficiency can be increased.

Further, in the ball endmill of the present invention, the second portion as well as the first portion has an arcuate shape which is convex in the direction of rotation of the ball endmill (however, the second portion may be shaped to be either straight or arcuate) and is contiguous to the terminal end of the first portion, and that the third portion as well as the first portion has an arcuate shape which is convex in the direction of rotation of the ball endmill and is contiguous to the terminal end of the second portion, so that the cutting chips can be evacuated along each ball-nosed end cutting edge. That is, this construction improves the performance of evacuation of the cutting chips.

Further, in the ball endmill of the present invention, each of the ball-nosed end cutting edges has the second and third portions having the respective second and third radii of curvature that are different from each other (wherein the second portion may be shaped to be either straight or arcuate). Therefore, where the ball endmill cuts the workpiece by the outer peripheral portion of each ball-nosed end cutting edge, namely, where the second and third portions of each ball-nosed end cutting edge are brought into contact with the workpiece, this construction causes a cutting resistance (cutting torque) exerted by the workpiece, to act in a direction that is different in the second and third portions of each ball-nosed end cutting edge, thereby making it possible to restrain vibration of the ball endmill.

In the ball endmill defined in the second aspect of the invention, in addition to the features provided by the ball endmill defined in the first aspect of the invention, there is a feature that the central angle of the first portion is in the range of from 60° to 120°. If the central angle is smaller than 60°, the length of the first portion of each ball-nosed end cutting edge as measured from its starting end (the axis of the ball endmill) to its terminal end (portion contiguous to the second portion) is made small, it is not possible to effectively utilize the effect that the direction of the cutting resistance (cutting torque) exerted by the workpiece and acting on the first portion is caused to vary. On the other hand, in the ball endmill of the present invention in which the central angle is not smaller than 60°, the length of the first portion of each ball-nosed end cutting edge can be made large sufficiently for utilizing the effect of the first portion which varies the direction of the cutting resistance (cutting torque).

If the central angle is larger than 120°, with an axial depth of cut of the ball endmill being set to a limit value 0.1 D (i.e., 10% of the outside diameter D), only the first portion of each ball-nosed end cutting edge is brought into contact with the workpiece. In this case, it is not possible to effectively enjoy the feature that causes the direction of the cutting resistance (cutting torque) exerted by the workpiece and acting on the ball endmill, to be different in the first and second portions of each ball-nosed end cutting edge. On the other hand, in the ball endmill of the present invention in which the central angle is not larger than 120°, even where the axial depth of cut of the ball endmill is set to the limit value 0.1 D, the second portion as well as the first portion can be brought into contact with the workpiece, thereby making it possible to cause the direction of the cutting resistance (cutting torque) exerted by the workpiece and acting on the ball endmill, to be different in the first and second portions. Thus, the vibration of the ball endmill can be restrained.

BRIEF DESCRIPTION OF THE DRAWINGS

FIG. 2 A set of schematic views schematically showing a distal end portion of the ball endmill.

FIG. 3 A set of side views (a) and (b) showing workpieces used in respective cutting tests.

FIG. 4 A set of views showing a ball endmill according to a modification of the embodiment of the invention.

Figure 1:
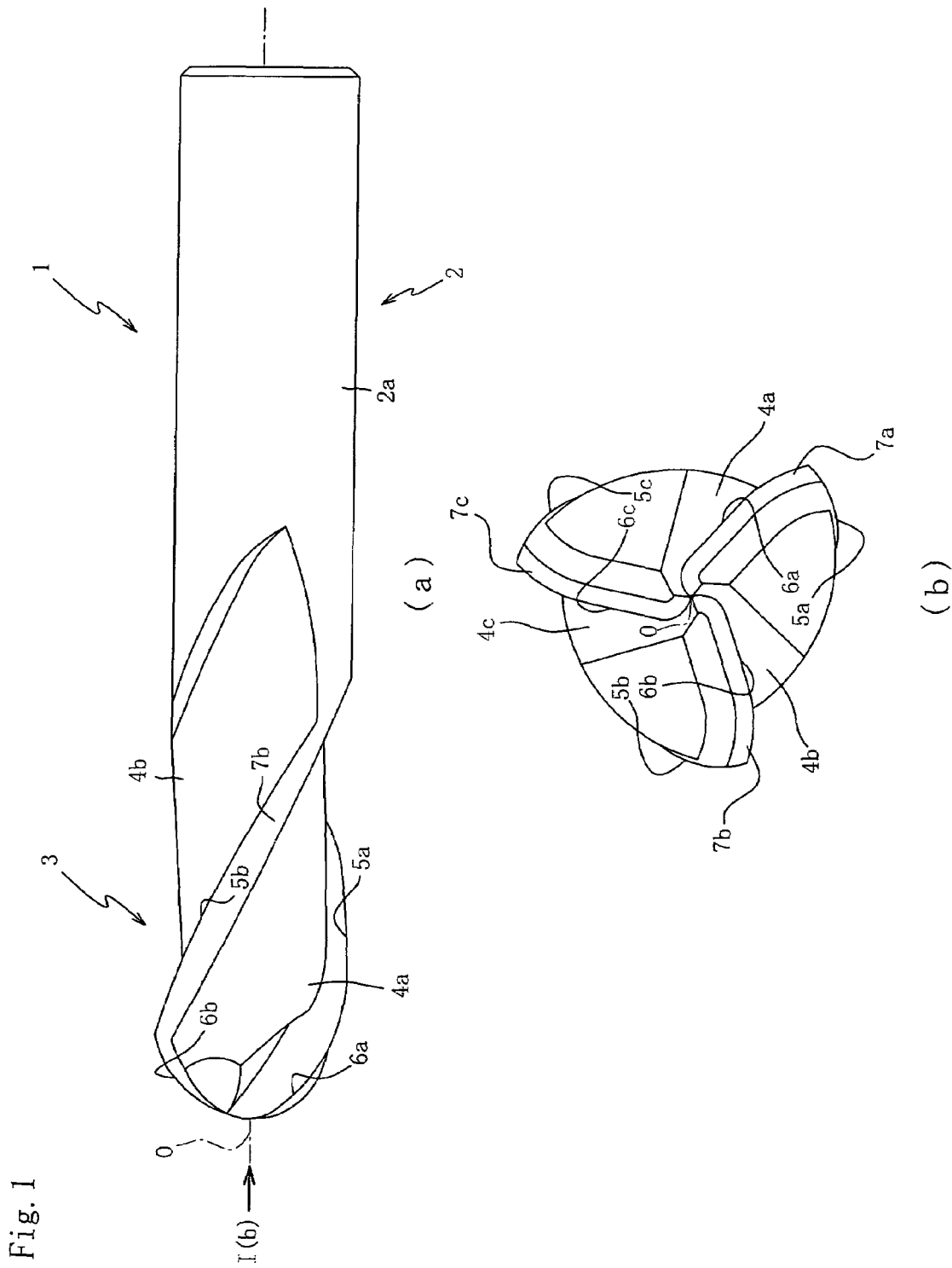
FIG. 1 A set of views showing a ball endmill according to an embodiment of the present invention, wherein view (a) is a front elevational view of the ball endmill, and view (b) is an enlarged side view showing in enlargement the ball endmill as seen in a direction indicated by arrow 1(b) in view (a).

1 ball endmill
2 tool body
6a-6c ball-nosed end cutting edges
6a1-6c1 first portions
6a2-6c2 second portions
6a3-6c3 third portions
D outside diameter
O axis
P connection point (terminal end of first portion, starting end of second portion)
Q connection point (terminal end of second portion, starting end of third portion)
R1 first radius of curvature
R2 second radius of curvature
R3 third radius of curvature
θ central angle

BEST MODE FOR CARRYING OUT THE INVENTION

Hereinafter, a preferred embodiment of the present invention will be described with reference to the drawings. View (a) of FIG. 1 is a front elevational view of a ball endmill 1 according to the embodiment of the invention, and view (b) of FIG. 1 is an enlarged side view showing in enlargement the ball endmill 1 as seen in a direction indicated by arrow 1(b) in view (a) of FIG. 1.

The ball endmill 1 is of solid type, and is a tool that is to be used principally for the purpose of performing an operation to machine a free-form surface of a die or mold. In the machining operation, a rotational force of a machine tool such as a machining center is transmitted to the ball endmill 1 via a holder (not shown) that is provided to hold a portion (a right side portion as seen in view (a) of FIG. 1) of a tool body 2 of the ball endmill 1.

The tool body 2 is constituted by cemented carbide alloy that is obtained by pressure sintering of tungsten carbide (WC) or the like. The portion (right side portion as seen in view (a) of FIG. 1) provides a shank portion 2a that is formed to have a cylindrical shape. The ball endmill 1 is attached to the machine tool, with the shank portion 2a being held by the holder.

Meanwhile, in another portion (left side portion as seen in view (a) of FIG. 1) of the tool body 2, there is provided a blade portion 3 having chip evacuation flutes 4a-4c, peripheral cutting edges 5a-5c, ball-nosed end cutting edges 6a-6c and lands 7a-7c. The free-form surface of the die or mold is machined by the blade portion 3.

The chip evacuation flutes 4a-4c are provided by three helical flutes to store and evacuate cutting chips produced during the machining operation, and are disposed symmetrically with respect to an axis O of the ball endmill 1.

The peripheral cutting edges 5a-5c are cutting edges formed in an outer periphery of the tool body 2. Each of the three peripheral cutting edges 5a-5c is provided by an edge at which a corresponding one of the chip evacuation flutes 4a-4c intersects with a corresponding one of the lands 7a-7c each formed in the outer periphery of the tool body 2 and having a predetermined width.

The ball-nosed end cutting edges 6a-6c are formed in a distal end portion (left side portion as seen in view (a) of FIG. 1) of the blade portion 3, and describe a semi-spherical-shaped locus while the ball endmill 1 is being rotated. Like each of the three peripheral cutting edges 5a-5c, each of the three ball-nosed end cutting edges 6a-6c is provided by the edge at which a corresponding chip one of the evacuation flutes 4a-4c intersects with a corresponding one of the lands 7a-7c. The ball-nosed end cutting edges 6a-6c are contiguous to the respective peripheral cutting edges 5a-5c.

In a distal end view seen in a direction (indicated by arrow 1(b) in view (a) of FIG. 1) of the axis O of the ball endmill 1, as shown in view (b) of FIG. 1, each of the ball-nosed end cutting edges 6a-6c extends from the outer periphery to the axis O, and has an arcuate shape which is convex in a direction of rotation of the ball endmill 1 (in the counterclockwise direction as seen in view (b) of FIG. 1). The ball-nosed end cutting edges 6a-6c will be described in detail with reference to FIG. 2.

FIG. 2 is a set of schematic views schematically showing the distal end portion of the ball endmill 1, wherein view (a) of FIG. 2 is the schematic view obtained by projecting the ball-nosed end cutting edges 6a-6c onto a plane, and view (b) of FIG. 2 is the enlarged schematic view showing in enlargement a part of view (a) of FIG. 2. It is noted that an outer peripheral portion of each ball-nosed end cutting edge 6 is not illustrated in view (b) of FIG. 2.

As shown in view (a) of FIG. 2, each of the ball-nosed end cutting edges 6a-6c is constituted by a first portion 6a1-6c1 whose starting end corresponds to the axis O of the ball endmill 1, a second portion 6a2-6c2 whose starting end is located at a connection point P is connected to a terminal end of the first portion 6a1-6c1, and a third portion 6a3-6c3 whose starting end is located at a connection point Q is connected to a terminal end of the second portion 6a2-6c2.

The first portion 6a1-6c1 constitutes a radially inner portion of each ball-nosed end cutting edge 6a-6c, and has an arcuate shape which is convex in the rotation direction of the ball endmill 1 (in the counterclockwise direction as seen in view (a) of FIG. 2) and which has a first radius R1 of curvature.

It is preferable that the first radius R1 of curvature is in a range of from 0.025 D to 0.10 D relative to an outside diameter D (i.e., a diameter as measured in a portion of the blade portion 3 in which the ball-nosed end cutting edges 6a-6c are connected to the respective peripheral cutting edges 5a-5c, irrespective of whether each peripheral cutting edge 5*a*-5*c* is provided by a straight cutting edge or a tapered cutting edge). If the first radius R1 of curvature is smaller than 0.025 D relative to the outside diameter D, a spacing gap between the first portions 6*a*1-6*c*1 of the adjacent ball-nosed end cutting edges 6*a*-6*c* in vicinity of the axis O of the ball endmill 1 is reduced whereby performance of evacuation of cutting chips is reduced. On the other hand, in the ball endmill 1 of the present embodiment in which the first radius R1 of curvature is not smaller than 0.025 D relative to the outside diameter D, the spacing gap between the first portions 6*a*1-6*c*1 can be sufficient for improving the performance of evacuation of cutting chips.

Further, in the case where the first radius R1 of curvature is smaller than 0.025 D relative to the outside diameter D, the spacing gap between the first portions 6*a*1-6*c*1 of the adjacent ball-nosed end cutting edges 6*a*-6*c* in vicinity of the axis O of the ball endmill 1 is reduced. The reduction of the spacing gap, when each ball-nosed end cutting edge 6*a*-6*c* is ground by a grinding wheel in a grinding step, could cause the grinding wheel to interfere with the adjacent ball-nosed end cutting edge 6*a*-6*c*. On the other hand, in the ball endmill 1 of the present embodiment in which the first radius R1 of curvature is not smaller than 0.025 D relative to the outside diameter D, the spacing gap between the first portions 6*a*1-6*c*1 can be sufficient for preventing the interference of the grinding wheel with the adjacent ball-nosed end cutting edge 6*a*-6*c*. Thus, it is possible to eliminate necessity of an excessively highly accurate control in the grinding step, leading to reduction in cost for machining the ball endmill 1.

Where the above-described interference of the grinding wheel could be caused, there is a limitation in designing configuration of a portion that could suffer from the interference (for example, an elimination of such a portion could result in reduction of strength). In this sense, the sufficient spacing gap between the first portions 6*a*1-6*c*1, which prevents the interference of the grinding wheel, is effective to increase a degree of freedom in designing If the first radius R1 of curvature is larger than 0.10 D relative to the outside diameter D, the direction of a line tangential to the first portion 6*a*1-6*c*1 of each ball-nosed end cutting edge 6*a*-6*c* does not substantially vary, as in the conventional ball endmill, the direction in which the cutting resistance (cutting torque) is exerted by the workpiece and acting on the ball endmill 1 does not substantially vary, thereby easily causing the vibration of the ball endmill 1. On the other hand, in the ball endmill 1 of the present embodiment in which the first radius R1 of curvature is not larger than 0.10 D relative to the outside diameter D, the direction of the line tangential to the first portion 6*a*1-6*c*1 is caused to vary, so that the direction of the cutting resistance (cutting torque) can be caused to vary, thereby making it possible to restrain vibration of the ball endmill 1.

Further, in the case where the first radius R1 of curvature is larger than 0.10 D relative to the outside diameter D, with an axial depth of cut of the ball endmill 1 being set to a limit value 0.1 D (i.e., 10% of the outside diameter D), only the first portion 6*a*1-6*c*1 of each ball-nosed end cutting edge 6*a*-6*c* is brought into contact with the workpiece. In this case, it is not possible to effectively enjoy the feature that causes the direction of the cutting resistance (cutting torque) exerted by the workpiece and acting on the ball endmill 1, to be different in the first and second portions 6*a*1-6*c*1, 6*a*2-6*c*2 of each ball-nosed end cutting edge 6*a*-6*c*, as indicated by arrows in view (b) of FIG. 2. On the other hand, in the ball endmill 1 of the present embodiment in which the first radius R1 of curvature is not larger than 0.10 D relative to the outside diameter D, where the axial depth of cut of the ball endmill 1 is set to the limit value 0.1 D, the second portion 6*a*2-6*c*2 as well as the first portion 6*a*1-6*c*1 can be brought into contact with the workpiece, thereby making it possible to cause the direction of the cutting resistance (cutting torque) exerted by the workpiece and acting on the ball endmill 1, to be different in the first and second portions 6*a*1-6*c*1, 6*a*2-6*c*2. Thus, the vibration of the ball endmill 1 can be restrained.

It is preferable that the outside diameter D is not smaller than 1 mm. If the outside diameter D is smaller than 1 mm, the spacing gap between the first portions 6*a*1-6*c*1 of the adjacent ball-nosed end cutting edges 6*a*-6*c* in vicinity of the axis O of the ball endmill 1 is reduced. The reduction of the spacing gap, when each ball-nosed end cutting edge 6*a*-6*c* is ground by the grinding wheel in the grinding step, could cause the grinding wheel to interfere with the adjacent ball-nosed end cutting edge 6*a*-6*c*. On the other hand, with the outside diameter D being not smaller than 1 mm, the spacing gap between the first portions 6*a*1-6*c*1 can be sufficient for preventing the interference of the grinding wheel with the adjacent ball-nosed end cutting edge 6*a*-6*c*. In the present embodiment, the outside diameter D is 12 mm, the first radius R1 of curvature is 0.0625 D (0.75 mm) relative to the outside diameter D (D=12 mm), and the first radii R1 of curvature of the first portions 6*a*1-6*c*1 of the respective ball-nosed end cutting edges 6*a*-6*c* are provided by respective radii of curvature that are equal to each other.

Further, each of the first portions 6*a*1-6*c*1 of the respective ball-nosed end cutting edges 6*a*-6*c* is defined by a central angle θ.

It is preferable that the central angle θ is in a range of from 60° to 120°. If the central angle is smaller than 60°, the length of the first portion 6*a*1-6*c*1 of each ball-nosed end cutting edge 6*a*-6*c* as measured from its starting end (the axis O of the ball endmill 1) to its terminal end (connection point P) is made small, it is not possible to effectively utilize the effect that the direction of the cutting resistance (cutting torque) exerted by the workpiece and acting on the first portion 6*a*1-6*c*1 is caused to vary. On the other hand, in the ball endmill 1 of the present embodiment in which the central angle θ is not smaller than 60°, the length of the first portion 6*a*1-6*c*1 of each ball-nosed end cutting edge 6*a*-6*c* can be made large sufficiently for utilizing the effect of the first portion 6*a*1-6*c*1 which varies the direction of the cutting resistance (cutting torque).

If the central angle θ is larger than 120°, with an axial depth of cut of the ball endmill 1 being set to the limit value 0.1 D (i.e., 10% of the outside diameter D), only the first portion 6*a*1-6*c*1 of each ball-nosed end cutting edge 6*a*-6*c* is brought into contact with the workpiece. In this case, it is not possible to effectively enjoy the feature that causes the direction of the cutting resistance (cutting torque) exerted by the workpiece and acting on the ball endmill 1, to be different in the first and second portions 6*a*1-6*c*1, 6*a*2-6*c*2 of each ball-nosed end cutting edge 6*a*-6*c*, as indicated by arrows in view (b) of FIG. 2.

On the other hand, in the ball endmill 1 of the present embodiment in which the central angle θ is not larger than 120°, where the axial depth of cut of the ball endmill 1 is set to the limit value 0.1 D, the second portion 6*a*2-6*c*2 as well as the first portion 6*a*1-6*c*1 can be brought into contact with the workpiece, thereby making it possible to cause the direction of the cutting resistance (cutting torque) exerted by the workpiece and acting on the ball endmill 1, to be different in the first and second portions 6*a*1-6*c*1, 6*a*2-6*c*2. Thus, the vibration of the ball endmill 1 can be restrained. In the present embodiment, the central angle θ is 90°, namely, the central angles θ defining the first portions 6a1-6c1 of the respective ball-nosed end cutting edges 6a-6c are all the same to each other.

The second portion 6a2-6c2 constitutes a radially intermediate portion of each ball-nosed end cutting edge 6a-6c, which is located between the first portion 6a1-6c1 and the second portion 6a2-6c2. As shown in view (a) of FIG. 2, the second portion 6a2-6c2 has an arcuate shape which is convex in the rotation direction of the ball endmill 1 (in the counterclockwise direction as seen in view (a) of FIG. 2) and which has a second radius R2 of curvature, or has a straight shape defined by a line that is tangential to the first portion 6a1-6c1 at the terminal end of the first portion 6a1-6c1 (at the connecting portion P). In the present embodiment, the second portion 6a2-6c2 is formed to be defined by the straight line.

Further, the second portion 6a2-6c2 is formed to have a length L as measured from its starting end (connection portion P) to its terminal end (connection portion Q), as shown in view (a) of FIG. 2.

It is preferable that the length L is in a range of from 0.20 D to 0.30 D relative to the outside diameter D so that the terminal end of the second portion 6a2-6c2 of each ball-nosed end cutting edge 6a-6c is located in a desired position. If the length L is smaller than 0.20 D relative to the outside diameter D, a radius of curvature of the third portion 6a3-6c3 of each ball-nosed end cutting edge 6a-6c is so large that the direction of a line tangential to the third portion 6a3-6c3 does not substantially vary, so that the direction in which the cutting resistance (cutting torque) is exerted by the workpiece and acts on the ball endmill 1 does not substantially vary, thereby easily causing the vibration of the ball endmill 1. On the other hand, in the ball endmill 1 of the present embodiment in which the length L is not smaller than 0.20 D relative to the outside diameter D, the direction of the line tangential to the second portion 6a3-6c3 is caused to vary, so that the direction of the cutting resistance (cutting torque) can be caused to vary, thereby making it possible to restrain vibration of the ball endmill 1.

If the length L is larger than 0.30 D relative to the outside diameter D, the third portion 6a3-6c3 of each ball-nosed end cutting edges 6a-6c can not be smoothly contiguous to the corresponding peripheral cutting edge 5a-5c, thereby reducing performance of evacuation of the cutting chips. On the other hand, in the ball endmill 1 of the present embodiment in which the length L is not larger than 0.30 D relative to the outside diameter D, the performance of evacuation of the cutting chips can be improved. In the present embodiment, the length L is 0.25 D (L=3 mm) relative to the outside diameter D (D=12 mm), and the lengths L of the second portions 6a2-6c2 of the respective ball-nosed end cutting edges 6a-6c are equal to each other.

The third portion 6a3-6c3 constitutes a radially outer portion of each ball-nosed end cutting edge 6a-6c, and has an arcuate shape which is convex in the rotation direction of the ball endmill 1 (in the counterclockwise direction as seen in view (a) of FIG. 2) and which has a third radius R3 of curvature. The second portion 6a2-6c2 is provided by a line that is tangential to the third portion 6a3-6c3 at the starting end of the third portion 6a3-6c3 (at the connecting portion Q).

It is preferable that the third radius R3 of curvature is in a range of from 0.35 D to 0.45 D relative to the outside diameter D. If the third radius R3 of curvature is smaller than 0.35 D relative to the outside diameter D, the third portion 6a3-6c3 of each ball-nosed end cutting edges 6a-6c can not be smoothly contiguous to the corresponding peripheral cutting edge 5a-5c, thereby reducing performance of evacuation of the cutting chips. On the other hand, in the ball endmill 1 of the present embodiment in which the third radius R3 of curvature is not smaller than 0.35 D relative to the outside diameter D, the performance of evacuation of the cutting chips can be improved.

Further, in the case where the third radius R3 of curvature is larger than 0.45 D relative to the outside diameter D, the direction of a line tangential to the third portion 6a3-6c3 of each ball-nosed end cutting edge 6a-6c does not substantially vary, as in the conventional ball endmill, the direction in which the cutting resistance (cutting torque) is exerted by the workpiece and acts on the ball endmill 1 does not substantially vary, thereby easily causing the vibration of the ball endmill 1.

On the other hand, in the ball endmill 1 of the present embodiment in which the third radius R3 of curvature is not larger than 0.45 D relative to the outside diameter D, the direction of the line tangential to the third portion 6a3-6c3 is caused to vary, so that the direction of the cutting resistance (cutting torque) can be caused to vary, thereby making it possible to restrain vibration of the ball endmill 1. In the present embodiment, the third radius R3 of curvature is 0.40 D (R3=4.8 mm) relative to the outside diameter D (D=12 mm), and the third radii R3 of curvature of the third portions 6a3-6c3 of the respective ball-nosed end cutting edges 6a-6c are provided by respective radii of curvature that are equal to each other.

Next, there will be described cutting tests that were conducted by using the ball endmill 1 constructed as described. FIG. 3 is a set of side views (a) and (b) showing workpieces 20 used in respective cutting tests. It is noted that a portion (right side portion as seen in each of views (a) and (b) of FIG. 3) of each workpiece 20 is not illustrated in FIG. 3.

In each of the cutting tests, the ball endmill 1 was arranged to be opposed to a cut surface 20a of the workpiece 20 with the axis O being held perpendicular to the surface 20a, and a cutting operation is performed by rotating the ball endmill 1 about the axis O while moving the ball endmill 1 in a direction perpendicular to the axis O under a predetermined cutting condition (such as an axial depth aa of cut as measured in the direction of the axis O). During the cutting operation, vibration (cutting resistance) generated on the ball endmill 1 was measured. It is noted that the cutting tests (hereinafter referred to as "cutting test 1" and "cutting test 2") were conducted under the respective cutting conditions whose specifications are different from each other as described below.

The specification of the cutting condition in the cutting test 1 is as follows:

Material of the workpiece 20: JIS-S50C

Cutting oil: No use (dry cutting with application of air blow)

Used machine: Horizontal type machining center

Spindle rotation speed: 4000 rev/min

Table feed rate: 1000 mm/min

Axial depth aa of cut: 0.5 mm (see view (a) of FIG. 3)

The specification of the cutting condition in the cutting test 2 was the same as that of the cutting condition in the cutting test 1 except for the axial depth of cut aa (depth of cut as measured in the axis O), which was set such that the ball endmill 1 of the present embodiment was brought into contact only at its second and third portions 6a2-6c2, 6a3-6c3 of each ball-nosed end cutting edge 6a-6c with the surface 20a (see view (b) of FIG. 3).

The cutting tests 1 and 2 were conducted by using, in addition to the ball endmill 1 (hereinafter referred to as "invention product") described in the above description of the embodiment, a ball endmill (hereinafter referred to as "conventional product") in which the radius of curvature of each arcuate-shaped ball-nosed end cutting edge is constant from the inner peripheral portion to the outer peripheral portion. The invention product and the conventional product are made of the same tool material (cemented carbide alloy). The number of the arcuate-shaped ball-nosed end cutting edges of the invention and conventional products is three. The conventional product is constructed such that the radius of curvature of each ball-nosed end cutting edge is 14.4 mm (that is three times as large as the third radius R3 of curvature of the third portion 6a3-6c3 of the invention product) in the distal end view seen in the direction of the axis of the ball endmill and such that the radii of curvature of the respective three ball-nosed end cutting edges are provided by respective radii of curvature that are equal to each other.

According to the result of the cutting test 1, in the conventional product, the direction of the cutting resistance (cutting torque) exerted by the workpiece and acting on the ball endmill was concentrated to be substantially constant, whereby the ball endmill was easily vibrated. Specifically described, in a case of cutting of the workpiece by the ball endmill for a length of time of 10 seconds, an average value of the cutting torque was 180 Nm and a variation amount of the cutting torque was 150 Nm (a maximum value of the variation amount was 230 Nm).

On the other hand, in the invention product, the cutting test revealed that the vibration of the ball endmill 1 can be restrained more than in the conventional product, since the direction of the cutting resistance (cutting torque) exerted by the workpiece and acting on the ball endmill 1 can be caused to vary. Specifically described, in a case of cutting of the workpiece by the ball endmill 1 for a length of time of 10 seconds, an average value of the cutting torque was 140 Nm and a variation amount of the cutting torque was 70 Nm (a maximum value of the variation amount was 100 Nm).

According to the result of the cutting test 2, in the conventional product, the direction of the cutting resistance (cutting torque) exerted by the workpiece and acting on the radially outer portion of each ball-nosed end cutting edge does not substantially vary, whereby the ball endmill was easily vibrated. Specifically described, in a case of cutting of the workpiece by the ball endmill for a length of time of 5 seconds, an average value of the cutting torque was 380 Nm and a variation amount of the cutting torque was 220 Nm (a maximum value of the variation amount was 550 Nm).

On the other hand, in the invention product, it was revealed that the vibration of the ball endmill 1 can be restrained more than in the conventional product, since the direction of the cutting resistance (cutting torque) was made different in the second and third portions 6a2-6c2, 6a3-6c3 of each ball-nosed end cutting edge 6a-6c. Specifically described, in a case of cutting of the workpiece by the ball endmill 1 for a length of time of 5 seconds, an average value of the cutting torque was 290 Nm and a variation amount of the cutting torque was 100 Nm (a maximum value of the variation amount was 150 Nm).

As described above, in the ball endmill 1, each of the ball-nosed end cutting edges 6a-6c includes the first, second and third portions 6a1-6c1, 6a2-6c2, 6a3-6c3 having the respective first, second and third radii R1, R2, R3 of curvature which are different in value from each other (in the present embodiment, the second portion 6a2-6c2 is shaped to be straight rather than arcuate). This construction causes the cutting resistance (cutting torque) exerted by the workpiece 20 to act in the direction that differs in the first, second and third portions 6a1-6c1, 6a2-6c2, 6a3-6c3 of each ball-nosed end cutting edge 6a-6c (see view (b) of FIG. 2), thereby making it possible to restrain vibration of the ball endmill 1.

That is, the direction in which the cutting resistance (cutting torque) is exerted by the workpiece 20 on the ball endmill 1 corresponds to a direction along each ball-nosed end cutting edge 6a-6c, i.e., a direction tangential to a circular arc defining each ball-nosed end cutting edge 6a-6c. Therefore, where the radius of curvature of each ball-nosed end cutting edge 6a-6c is constant from the inner peripheral portion up to the outer peripheral portion of the ball-nosed end cutting edge 6a-6c, as in the conventional ball endmill, the direction of the cutting resistance (cutting torque) does not substantially differ in the inner and outer peripheral portions of the ball-nosed end cutting edge 6a-6c, thereby easily causing the ball endmill 1 to be vibrated.

On the other hand, in the ball endmill 1 of the present embodiment, as described above, it is possible to cause the direction of the cutting resistance (cutting torque) exerted by the workpiece 20, to be different in the first, second and third portions 6a1-6c1, 6a2-6c2, 6a3-6c3 of each ball-nosed end cutting edge 6a-6c, thereby making it possible to restrain vibration of the ball endmill 1. Owing to the reduction in the vibration, the feed rate and the depth of cut can be increased whereby the cutting efficiency can be improved.

Further, in the ball endmill 1 of the present embodiment, since each ball-nosed end cutting edge 6a-6c includes the first, second and third portions 6a1-6c1, 6a2-6c2, 6a3-6c3 with the first radius R1 of curvature being in the range of from 0.025 D to 0.10 D relative to the outside diameter D, each of the first, second and third radii R1, R2, R3 of curvature can be made smaller than in the conventional ball endmill, whereby each ball-nosed end cutting edge 6a-6c can have an increased length. This construction leads to increase in a length of time for which each ball-nosed end cutting edge 6a-6c is in contact with the cut surface 20a and the consequent reduction in an impact load acting on the ball endmill 1, thereby making it possible to restrain vibration of the ball endmill 1.

In addition, in the ball endmill 1 of the present embodiment, since each ball-nosed end cutting edge 6a-6c can have the increased length, as described above, each ball-nosed end cutting edge 6a-6c is brought in contact at its increased area with the cut surface 20a, thereby making is possible to increase a cutting performance of the ball endmill 1. Consequently, the feed rate and the depth of cut can be increased, enabling the cutting efficiency to be improved.

Further, in the ball endmill 1 of the present embodiment, the second portion 6a2-6c2 as well as the first portion 6a1-6c1 has an arcuate shape which is convex in the direction of rotation of the ball endmill 1 (in the present embodiment, the second portion 6a2-6c2 is shaped to be straight) and is contiguous to the terminal end (connection portion P) of the first portion 6a1-6c1, and that the third portion 6a3-6c3 as well as the first portion 6a1-6c1 has an arcuate shape which is convex in the direction of rotation of the ball endmill 1 and is contiguous to the terminal end (connection portion Q) of the second portion 6a2-6c2, so that the cutting chips can be evacuated along each ball-nosed end cutting edge 6a-6c. That is, this construction improves the performance of evacuation of the cutting chips.

Further, in the ball endmill 1 of the present embodiment, each of the ball-nosed end cutting edges 6a-6c has the second and third portions 6a2-6c2, 6a3-6c3 having the respective second and third radii R2, R3 of curvature that are different from each other (in the present embodiment, the second portion 6a2-6c2 is shaped to be straight). Therefore, where the ball endmill 1 cuts the workpiece 20 by the outer peripheral portion of each ball-nosed end cutting edge 6a-6c, namely, where the second and third portions 6a2-6c2, 6a3-6c3 of each ball-nosed end cutting edge 6a-6c are brought into contact with the cut surface 20a, this construction causes a cutting resistance (cutting torque) exerted by the workpiece, to act in a direction that is different in the second and third portions 6a2-6c2, 6a3-6c3 of each ball-nosed end cutting edge 6a-6c, thereby making it possible to restrain vibration of the ball endmill 1.

While the present invention has been described based on the embodiment, it is to be easily imagined that the present invention is not at all limited to the details of the above-described embodiment but may be subjected to various improvements and modifications within a range that is not deviated from the gist of the invention.

For example, in the above-described embodiment, the ball endmill 1 is a three-flute endmill having three teeth each provided by the peripheral and ball-nosed end cutting edges 5a-5c, 6a-6c. However, the ball endmill 1 is not necessarily limited to such a detail, but may be constructed to have two teeth, or four or more teeth, for example. In this case, too, as in the above-described embodiment, the direction of the cutting resistance (cutting torque) exerted by the workpiece 20 and acting on the ball endmill 1 can be varied, thereby making it possible to restrain vibration of the ball endmill 1.

Further, in the above-described embodiment, the first radii R1 of curvature of the first portions 6a1-6c1 of the respective ball-nosed end cutting edges 6a-6c are provided by respective radii of curvature that are equal to each other, and the third radii R3 of curvature of the third portions 6a3-6c3 of the respective ball-nosed end cutting edges 6a-6c are provided by respective radii of curvature that are equal to each other. However, the first radii R1 of curvature of the first portions 6a1-6c1 may be provided by respective radii of curvature that are different from each other, and the third radii R3 of curvature of the third portions 6a3-6c3 may be provided by respective radii of curvature that are different from each other.

Further, while the second portion 6a2-6c2 of each ball-nosed end cutting edge 6a-6c is shaped to be straight in the present embodiment, the second portion 6a2-6c2 may be shaped to be arcuate and convex in the rotation direction of the ball endmill 1, as shown in FIG. 4. In this modification to the embodiment, a first circle C1 that is partially constituted by the circle arc defining the first portion 6a1-6c1 is inscribed at the connection point P to a second circle C2 that is partially constituted by the circle arc defining the second portion 6a2-6c2, while a third circle C3 that is partially constituted by the circle arc defining the third portion 6a3-6c3 is inscribed at the connection point Q to the second circle C2.

The invention claimed is:

1. A ball endmill including a cylindrical tool body which is to be rotated about an axis thereof as a rotary axis, and ball-nosed end cutting edges which are provided in a distal end portion of the tool body and which describe a semi-spherical-shaped locus while the tool body is being rotated, the ball endmill being characterized in that:
   each of the ball-nosed end cutting edges has a first portion formed to extend from the axis as a starting end thereof, a second portion formed to extend from a terminal end of the first portion as a starting end thereof, and a third portion formed to extend from a terminal end of the second portion as a starting end thereof;
   the first portion is shaped to be arcuate which is convex in a direction of rotation of the tool body and which has a first radius of curvature as seen in a distal end view in a direction of the axis, the first radius of curvature being in a range of from 0.025 D to 0.10 D relative to an outside diameter D;
   the second portion is shaped to be straight or arcuate which is convex in the direction of rotation of the tool body and which has a second radius of curvature as seen in the distal end view in the direction of the axis, the second radius of curvature being larger than the first radius of curvature where the second portion is shaped to be arcuate; and
   the third portion is shaped to be arcuate which is convex in the direction of rotation of the tool body and which has a third radius of curvature as seen in the distal end view in the direction of the axis, the third radius of curvature being smaller than the second radius of curvature where the second portion is shaped to be arcuate.

2. The ball endmill according to claim 1, characterized in that the first portion has an inscribed angle that is in a range of from 60° to 120° as seen in the distal end view in the direction of the axis.

3. A ball endmill comprising (a) a cylindrical tool body which is to be rotated about an axis thereof, and (b) ball-nosed end cutting edges which are located in an axially distal end portion of said tool body and which describe a semi-spherical-shaped locus during rotation of said tool body,
   wherein each of said ball-nosed end cutting edges includes (b-1) a first portion extending from said axis and provided by a radially inner portion of each of said ball-nosed end cutting edges, (b-2) a second portion contiguous to said first portion and provided by a radially intermediate portion of each of said ball-nosed end cutting edges, and (b-3) a third portion contiguous to said second portion and provided by a radially outer portion of each of said ball-nosed end cutting edges,
   wherein said first portion is defined by a circular arc which is convex in a direction of the rotation of said tool body and which has a first radius of curvature as measured in a distal end view perpendicular to said axis, a ratio of said first radius of curvature to an outside diameter of said cylindrical body being not smaller than 0.025 and not larger than 0.10,
   wherein said second portion is defined by a straight line,
   and wherein said third portion is defined by a circular arc which is convex in the direction of the rotation of said tool body and which has a third radius of curvature as measured in the distal end view perpendicular to said axis.

4. The ball endmill according to claim 3, wherein said circular arc defining said first portion of each of said ball-nosed end cutting edges has a central angle that is not smaller than 60° and is not larger than 120° as measured in said distal end view.

5. The ball endmill according to claim 3,
   wherein said first and second portions of each of said ball-nosed end cutting edges are connected to each other at a first connection point,
   wherein said second and third portions of each of said ball-nosed end cutting edges are connected to each other at a second connection point,
   wherein a first circle that is partially constituted by said circular arc defining said first portion is inscribed at said first connection point to said straight line defining said second portion,
   and wherein a third circle that is partially constituted by said circular arc defining said third portion is inscribed at said second connection to said straight line defining said second portion.

6. The ball endmill according to claim 3, further comprising (c) peripheral cutting edges each of which is contiguous to said third portion of a corresponding one of said ball-nosed end cutting edges and extends away from said axially distal end portion toward a shank portion of said tool body.

7. The ball endmill according to claim 3, wherein a ratio of said third radius of curvature to said outside diameter of said cylindrical body is not smaller than 0.35 and not larger than 0.45.

8. The ball endmill according to claims 3, wherein said ball-nosed end cutting edges consist of at least three ball-nosed end cutting edges.

9. A ball endmill comprising (a) a cylindrical tool body which is to be rotated about an axis thereof, and (b) ball-nosed end cutting edges which are located in an axially distal end portion of said tool body and which describe a semi-spherical-shaped locus during rotation of said tool body, wherein each of said ball-nosed end cutting edges includes (b-1) a first portion extending from said axis and provided by a radially inner portion of each of said ball-nosed end cutting edges, (b-2) a second portion contiguous to said first portion and provided by a radially intermediate portion of each of said ball-nosed end cutting edges, and (b-3) a third portion contiguous to said second portion and provided by a radially outer portion of each of said ball-nosed end cutting edges, wherein said first portion is defined by a circular arc which is convex in a direction of the rotation of said tool body and which has a first radius of curvature as measured in a distal end view perpendicular to said axis, a ratio of said first radius of curvature to an outside diameter of said cylindrical body being not smaller than 0.025 and not larger than 0.10, wherein said second portion is defined by a circular arc which is convex in said direction of the rotation of said tool body and which has a second radius of curvature as measured in the distal end view perpendicular to said axis, said second radius of curvature being larger than said first radius of curvature, and wherein said third portion is defined by a circular arc which is convex in the direction of the rotation of said tool body and which has a third radius of curvature as measured in the distal end view perpendicular to said axis, said third radius of curvature being smaller than said second radius of curvature.

10. The ball endmill according to claim 9, wherein said circular arc defining said first portion of each of said ball-nosed end cutting edges has a central angle that is not smaller than 60° and is not larger than 120° as measured in said distal end view.

11. The ball endmill according to claim 9,
wherein said first and second portions of each of said ball-nosed end cutting edges are connected to each other at a first connection point,
wherein said second and third portions of each of said ball-nosed end cutting edges are connected to each other at a second connection point,
wherein a first circle that is partially constituted by said circular arc defining said first portion is inscribed at said first connection point to a second circle that is partially constituted by said circular arc defining said second portion,
and wherein a third circle that is partially constituted by said circular arc defining said third portion is inscribed at said second connection to said second circle.

12. The ball endmill according to claim 9, further comprising (c) peripheral cutting edges each of which is contiguous to said third portion of a corresponding one of said ball-nosed end cutting edges and extends away from said axially distal end portion toward a shank portion of said tool body.

13. The ball endmill according to claim 9, wherein a ratio of said third radius of curvature to said outside diameter of said cylindrical body is not smaller than 0.35 and not larger than 0.45.

14. The ball endmill according to claims 9, wherein said ball-nosed end cutting edges consist of at least three ball-nosed end cutting edges.

15. A ball endmill comprising (a) a cylindrical tool body which is to be rotated about an axis thereof, and (b) ball-nosed end cutting edges which are located in an axially distal end portion of said tool body and which describe a semi-spherical-shaped locus during rotation of said tool body, wherein each of said ball-nosed end cutting edges includes (b-1) a first portion extending from said axis and provided by a radially inner portion of each of said ball-nosed end cutting edges, (b-2) a second portion contiguous to said first portion and provided by a radially intermediate portion of each of said ball-nosed end cutting edges, and (b-3) a third portion contiguous to said second portion and provided by a radially outer portion of each of said ball-nosed end cutting edges, and wherein said first, second and third portions of each of said ball-nosed end cutting edges have respective first, second and third radii of curvature that are different from each other.

16. The ball endmill according to claims 15, wherein said second radius of curvature is larger than said first radius of curvature, while said third radius of curvature is smaller than said second radius of curvature.

* * * * *